Feb. 23, 1932.   A. HAINLEN   1,846,964
STEAM COOKING POT
Filed June 11, 1929
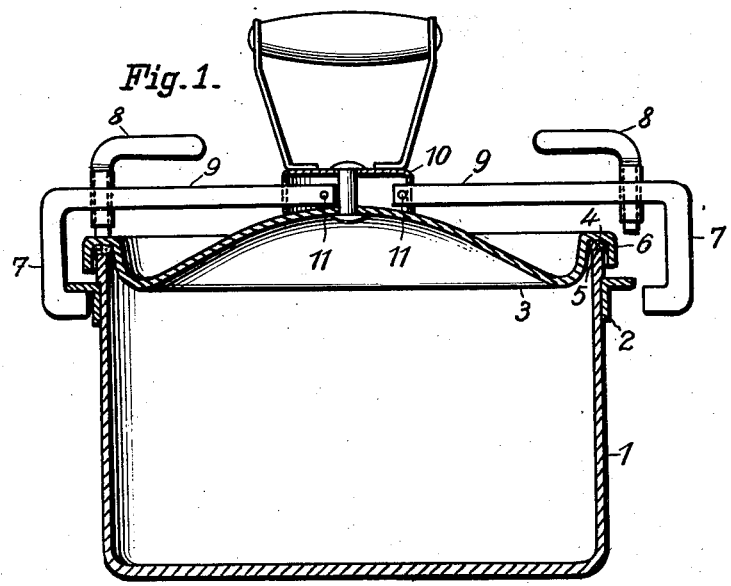
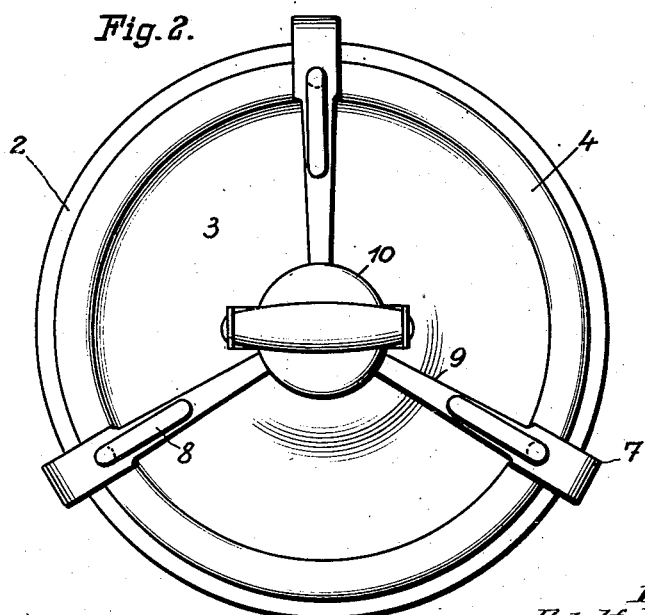
Inventor:
Adolf Hainlen,
Att'y.

Patented Feb. 23, 1932

1,846,964

UNITED STATES PATENT OFFICE

ADOLF HAINLEN, OF GEISLINGEN-STEIGE, GERMANY, ASSIGNOR TO THE FIRM WURTTEMBERGISCHE METALLWARENFABRIK AKTIENGESELLSCHAFT, OF GEISLINGEN-STEIGE, GERMANY

STEAM COOKING POT

Application filed June 11, 1929, Serial No. 370,104, and in Germany February 7, 1929.

This invention relates to steam cooking pots of the type having an outer cover. There exist pots of this type in which the cover can be fixed to the pot body by means of screws attached to bows and bearing on the rim of said cover, the pressure exerted by said screws being transmitted through the cover and taken up directly by the rim of the pot body. Steam cooking pots of this kind are distinguished, it is true, by the great simplicity of their closing members, but on the other hand they suffer from the drawback that the bows mentioned are themselves attached to the pot by means of hinges so that these parts, viz. the bows with the screws, as well as said hinges, hang down loosely at the outer side of the pot when the cover has been disconnected from it whereby emptying the pot and cleaning it thereafter is rendered more or less difficult.

These drawbacks are obviated in the present invention in which the bows and the pressure screws are attached to a common carrier which can be disconnected from the pot body or pot proper. This latter is provided with an outer flange which is engaged from below by said bows when these have been brought into their operative position. The cover itself may serve as common carrier for the said bows, but also a separate member, especially a detachable ring, may be used as bow carrier, as is more fully described hereinafter.

The closing device designed according to this invention is just as simple as the known closing devices mentioned in the first paragraph of this specification. It excels, however therein that the closing members can be completely detached from the pot so that emptying and cleaning the same is no more in the least hindered. Besides, as also the detached closing members remain connected with each other none of them can be mislaid or get lost.

The invention is illustrated diagrammatically and by way of example on the accompanying drawings on which Figure 1 is a vertical section through a steam cooking pot provided with a closing device designed according to this invention, Figure 2 a plan of that pot with its cover etc, 1 (Fig. 1) denotes the pot body or pot proper which may consist, for instance, of sheet steel and is interiorly preferably tinned or enamelled or plated in such a manner that the inner surface is rendered rust-proof. But also non-rusting steel may be used. The circumferential surface of the body 1 is provided with a flange 2 which may be welded thereto. In lieu of this flange a plurality of uniformly distributed brackets or other projections may be affixed to said surface.

3 is the cover which is so shaped, for instance by pressing, that its rim forms an inverted groove 4 which fits upon the rim or edge 5 of the body 1. A packing 6 is inserted into said groove and bears upon said edge.

There are, in the constructional form shown by way of example, three angular members 7 termed "bows" in the following part of this specification. Each bow constitutes practically a lying U having a short leg and a long one, The short legs of the bows are intended to engage the flange 2 in the manner shown in the lefthand part of Fig. 1. The long legs 9 of the U's are horizontally shiftable in a hollow central member 10 affixed to the cover 3 and provided with a grip, which is the grip of the cover. The legs 9 are prevented from leaving the member 10 by transverse pins 11 or the like. Near the vertical body portion of each body a pressing screw 8, the upper portion of which is bent at right angles so as to form a grip, is inserted into the leg 9 of each bow.

I wish it to be understood that with comparatively small cooking pots already two bows arranged diametrically opposite to one another will do, but for larger pots at least three bows should be provided.

The bows can be shifted from the position shown in the righthand part of Fig. 1 into the position shown in the lefthand part thereof and, of course, reversely. When the bows are in the first-mentioned of these positions the cover can be removed from, or placed upon, the pot body. When the cover has been put upon the body the bow legs 9 are shifted in the member 10 until the short leg of the bow lies below the flange 2 or the equivalent thereof. Then the screws 8 are so turned as to draw said short legs against the flange whereby the cover is firmly pressed upon the pot body and the packing ring 6 is compressed in the groove 4 by and between the groove bottom and the pot body rim, the pot being now tightly closed.

It is obvious that none of the closing members can get unexpectedly detached from the cover, but nevertheless the member 10 may be so designed that the bow 7/9 can be detached from them if it is wanted. This can be effected by providing in the circumferential wall of the member 10 vertical slots through which the projecting parts of the pins 11 can leave the interior of said member after the legs 9 have been turned by 90 degrees.

I claim:

1. A steam cooking pot, comprising, in combination, a pot body and a cover therefor; a guide member secured to the upper surface of said cover and having apertures in its circumferential wall; a flange at the outer surface of said pot body near the upper edge thereof; bows, of the two legs of which one is slidably located in one of said apertures, and the other of which is adapted to engage said flange at the lower face thereof when it is in its operative position; pressure screws passing through said bows and being so arranged therein that they are located just over the pot rim when the bows are in their operative position.

2. A steam cooking pot, comprising, in combination, a pot body and a cover therefor; a guide member secured to the upper surface of said cover and having apertures in its circumferential wall; a flange at the outer surface of said pot body near the upper edge thereof; bows, of the two legs of which one is slidably located in one of said apertures, and the other of which is adapted to engage said flange at the lower face thereof when it is in its operative position; retaining pins at the bow leg ends located in said guide member; pressure screws passing through said bows and being so arranged therein that they are located just over the pot rim when the bows are in their operative position.

3. A steam cooking pot comprising in combination, a pot body and a cover therefor, a guide member having apertures in its circumferential wall secured to the upper surface of the cover, a flange provided on the outside of the pot body, bows, one end of each bow being slidable in the guide member while the other end of said bow is adapted when in operative position to engage under said flange, clamping screws secured in said bows and constructed and arranged to be positioned when in operative position directly above the edge of the cover.

4. A steam cooking pot comprising in combination a pot body and a cover, a guide member with guiding openings in its lateral face, bows, the one end of each of said bows being slidably mounted in said guiding openings while the other end of said last mentioned bow engages, when in operative position, the lower face of said flange, pins in the ends of each bow which are located in the guide member, the position of the pins and the dimensions of the guide openings being such that the pins cannot come out of the guide member when the bows are in their normal position but that such movement is permitted when the bows are rotated, and clamping screws held in said bows constructed and arranged to be positioned directly above the peripheral edge of the cover when in operative position.

5. A steam cooking pot comprising in combination a pot body and a cover, a guide member rigidly connected to the cover and having side and top walls, the side walls having openings and the top wall having a handle, a flange on the peripheral edge of the pot, bows, one end of each of which is movably mounted in an opening of the guide member while the other end is adapted to engage, when in operative position, under said flange, and clamping screws held in said bows and arranged to stand directly above the edge of the pot when in operative position.

ADOLF HAINLEN.